United States Patent
Saia et al.

[11] Patent Number: 5,874,037
[45] Date of Patent: *Feb. 23, 1999

[54] METHOD FOR MOLDING COMPOSITE METAL-ELASTOMER STYLED WHEELS

[75] Inventors: Ronald P. Saia, Perrysburg; Paul N. Skotynsky, Oregon, both of Ohio

[73] Assignee: Motor Wheel Corporation, Lansing, Mich.

[ * ] Notice: This patent issued on a continued prosecution application filed under 37 CFR 1.53(d), and is subject to the twenty year patent term provisions of 35 U.S.C. 154(a)(2).

[21] Appl. No.: 383,957

[22] Filed: Feb. 6, 1995

Related U.S. Application Data

[63] Continuation of Ser. No. 6,625, Jan. 21, 1993, abandoned.

[51] Int. Cl.⁶ .............................. B29C 33/10; B29C 37/02
[52] U.S. Cl. ........................ 264/268; 264/275; 264/276; 264/316; 425/812
[58] Field of Search ..................................... 264/275, 294, 264/328.3, 255, 259, 279, 276, 316, 328.9, 268; 425/812

[56] References Cited

U.S. PATENT DOCUMENTS

| | | |
|---|---|---|
| 3,459,843 | 8/1969 | Fischler ................................... 264/316 |
| 3,669,501 | 6/1972 | Derleth . |
| 3,699,204 | 10/1972 | Ogata ...................................... 264/316 |
| 3,756,658 | 9/1973 | Adams . |
| 3,762,677 | 10/1973 | Adams . |
| 3,794,529 | 2/1974 | Thompson . |
| 3,815,200 | 6/1974 | Adams . |
| 3,823,982 | 7/1974 | Spisak . |
| 3,827,756 | 8/1974 | Mitchell . |
| 3,894,775 | 7/1975 | Christoph et al. . |
| 3,915,502 | 10/1975 | Connell . |
| 3,918,762 | 11/1975 | Hampshire . |
| 3,935,291 | 1/1976 | Jackson . |

(List continued on next page.)

FOREIGN PATENT DOCUMENTS

| | | |
|---|---|---|
| 2457907 | 9/1976 | Germany . |
| 1290946 | 11/1972 | United Kingdom . |

*Primary Examiner*—Angela Ortiz
*Attorney, Agent, or Firm*—MacMillan, Sobanski & Todd, LLC

[57] ABSTRACT

Apparatus, method and sealing means for liquid urethane reaction mixture injection molding of a composite styled metal and plastic vehicle wheel wherein a metal wheel subassembly serves as a preform between the separable mold parts in the mold apparatus and which is united with the plastic body molding material to form the composite wheel. One of the mold parts has a mold cavity surface operable in mold closed condition to define with the outboard face of the wheel subassembly a mold cavity adapted to provide an ornamental configuration for an outboard face of the plastic body of the composite wheel. A gas permeable and liquid infiltratable mold sealing membrane has a first portion thereof communicating with ambient atmosphere externally of the mold cavity and a second portion thereof communicating with the mold cavity. The membrane is made of fabric material comprising random fibers, calendered into sheet form and selected from the group consisting of polyethylene, polypropylene, Teflon coated polyethylene, and Teflon coated polypropylene fibers. The membrane has a gas permeability ranging between about one to twenty cubic feet of air per minute, and more particularly between about one to four cubic feet of air per minute. The membrane fabric material consists of fibers processed into coherent sheet form having a thickness ranging between about 0.01 inches to about 0.10 inches and having a weight in the order of about 15 ounces per square yard, and is heat seared on at least the side thereof juxtaposed to the mold cavity. The mold sealing membrane is operable to provide flow-through limited venting of gases from the mold cavity to ambient until the membrane seal is clogged by liquid reaction molding material infiltrate therein.

12 Claims, 4 Drawing Sheets

U.S. PATENT DOCUMENTS

| | | |
|---|---|---|
| 3,956,451 | 5/1976 | Adams . |
| 3,998,494 | 12/1976 | Spisak . |
| 4,304,542 | 12/1981 | Sauer ................................. 264/511 |
| 4,398,770 | 8/1983 | Smith . |
| 4,659,148 | 4/1987 | Grill . |
| 4,682,820 | 7/1987 | Stalter . |
| 4,786,027 | 11/1988 | Stalter . |
| 4,790,605 | 12/1988 | Stalter . |
| 4,847,030 | 7/1989 | Stalter . |
| 4,861,538 | 8/1989 | Stalter, Sr. ...................... 264/328.9 |
| 4,963,083 | 10/1990 | Stalter . |
| 4,968,465 | 11/1990 | Rhodes, Jr. ........................ 264/276 |
| 4,976,497 | 12/1990 | Post et al. . |
| 5,059,106 | 10/1991 | Joseph . |
| 5,088,798 | 2/1992 | Stalter . |
| 5,128,085 | 7/1992 | Post et al. . |
| 5,637,272 | 6/1997 | Yamamoto et al. .................. 264/316 |

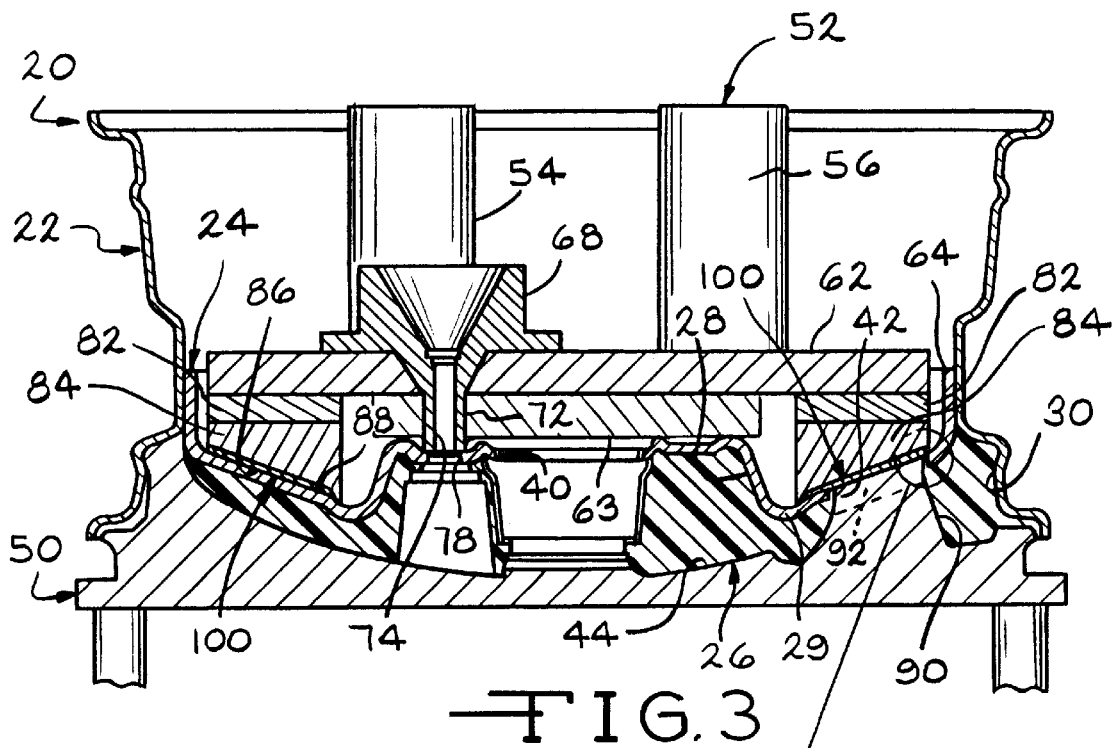
FIG. 3
FIG. 3A
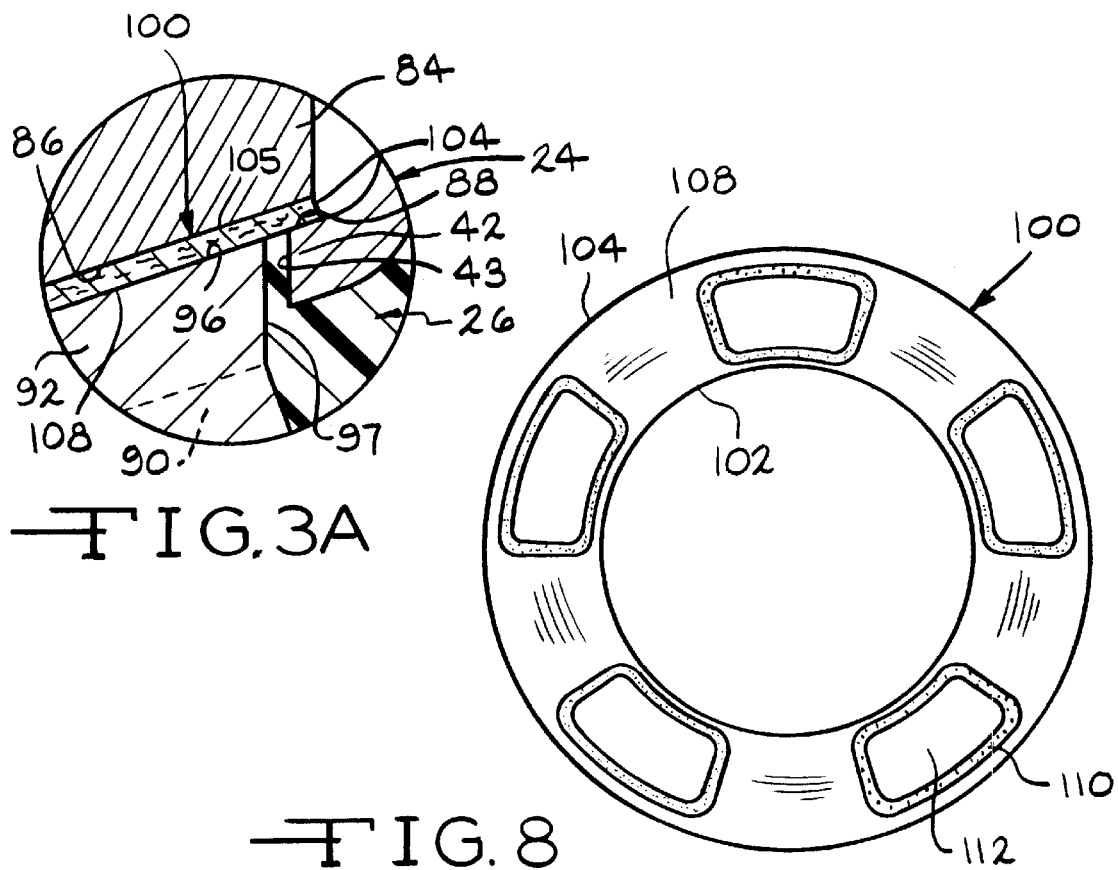
FIG. 8

METHOD FOR MOLDING COMPOSITE METAL-ELASTOMER STYLED WHEELS

This is a continuation of application Ser. No. 08/006,625 filed on Jan. 21, 1993, now abandoned.

FIELD OF THE INVENTION

This invention relates to vehicle wheels of the composite metal-elastomer styled automotive-type with a three-dimensionally contoured ornamental outboard plastic body permanently affixed to a metal backbone wheel construction, and more particularly to molding apparatus and method for constructing such a wheel.

BACKGROUND OF THE INVENTION

In the early 1970's Motor Wheel Corporation of Lansing, Michigan, assignee of applicant herein, as well as its then parent company, The Goodyear Tire & Rubber Company of Akron, Ohio, developed and introduced an improved form of composite metal-elastomer styled wheel marketed under the trademark "POLYCAST" of Motor Wheel Corporation (assignee of record herein). Such styled wheels provided an automotive type wheel in which metallic parts of simple, conventional configuration, for which manufacturing equipment was already available, are utilized as the basic structural components to thereby obtain a high strength standardized wheel construction at minimum cost. The aesthetically pleasing appearance was imparted to this standard steel backbone by a permanently adhered ornamental plastic body, either molded separately or in-situ as a homogeneous one-piece body, or in the form of a plastic cover secured by an adhesive foam body to the outboard side of the wheel. This provided an improved anti-noise characteristic to the wheel and enabled the appearance of the wheel to be readily and economically varied to suit different customer's styling requirements without varying the basic structural components of the wheel. Additional benefits resided in the side impact cushioning to prevent damage to the wheel while retaining the high strength and impact resistance advantages of the time-proven conventional ductile steel wheel components. Wider variations in styling and contour configurations were also obtained than were possible in the previous deep drawn styled all-steel wheels. The serious problems of loss and theft of removable wheel covers were also eliminated.

Various embodiments of such "POLYCAST" wheels, as well as methods and apparatus for producing the same, are set forth in the following United States Patents assigned to the assignee herein, which are incorporated herein by reference:

U.S. Pat. No. 3,669,501, 6/1972, Derleth,
U.S. Pat. No. 3,756,658, 9/1973, Adams,
U.S. Pat. No. 3,762,677, 10/1973, Adams,
U.S. Pat. No. 3,794,529, 2/1974, Thompson,
U.S. Pat. No. 3,815,200, 6/1974, Adams,
U.S. Pat. No. 3,918,762, 11/1975, Hampshire,
U.S. Pat. No. 3,935,291, 1/1976, Jackson,
U.S. Pat. No. 3,956,451, 5/1976, Adams,
U.S. Pat. No. 4,398,770, 8/1983, Smith,
U.S. Pat. No. 4,659,148, 4/1987, Grill,
U.S. Pat. No. 4,682,820, 7/1987, Stalter,
U.S. Pat. No. 4,786,027, 11/1988, Stalter,
U.S. Pat. No. 4,790,605, 12/1988, Stalter,
U.S. Pat. No. 4,847,030, 7/1989, Stalter,
U.S. Pat. No. 4,861,538, 8/1989, Stalter,
U.S. Pat. No. 4,963,083, 10/1990, Stalter
U.S. Pat. No. 4,976,497, 12/1990, Post et al,
U.S. Pat. No. 5,059,106, 10/1992, Joseph,
U.S. Pat. No. 5,088,798, 2/1992, Stalter.
U.S. Pat. No. 5,128,085, 7/1992, Post et al.

Other prior art patents issued to unrelated parties and directed to various types of such styled metal and plastic wheels include U.S. Pat. Nos. 3,823,982; 3,827,756; 3,894,775; 3,915,502; and 3,998,494 as well as British Patent No. 1,290,946 (1972) and German Offenlegunschrift No. 2,457,907 (June/1976).

In one embodiment of the manufacture of such POLYCAST wheels, a portion of the mold comprises a conventional metal vehicle wheel having a drop center rim secured to a central disc or body having the usual bolt circle holes and a central aperture so that the disc can be mounted on an axle, drum or disc brake assembly. The metal wheel is employed in conjunction with an upper back-up clamp and lower mold part to define therewith a sealed cavity for molding and attaching a three-dimensional contoured plastic overlay, the overlay thus being molded in-situ and permanently attached to the outboard side of the wheel in the mold apparatus. Preferably, the wheel forms the upper surface of the mold cavity and a reaction mixture of a urethane elastomer liquid adhesive material is injected or poured into the mold to fill the cavity and contact the outboard surface of the wheel assembly. The urethane material components react and solidify to form a high density non-cellular elastomer body which permanently adheres to the outboard surface of the wheel subassembly. The plastic overlay may also be molded from a lower density microcellular closed cell urethane elastomer adhesive material, or a separate decorative cover may be pre-formed and permanent adhesively adhered to the steel wheel subassembly. If a urethane material molded-in-situ embodiment is employed, which is presently preferred, the urethane is allowed to react, expand (if cellular), cure and thereby solidify in the mold cavity, and then the mold is opened so that the wheel with the overlay securely adhered to it may be removed from the mold. The overlay may then be painted or otherwise covered with a decorative coating to provide a finished metallic-appearing ornamental wheel. The urethane elastomer thus forms a plastic body having a three-dimensional contour which is permanently attached to the outboard side of the wheel to provide a decorative surface, and the elastomer overlay appears to be an integral portion of the metal wheel.

Due to the preferred orientation of the overlay beneath the wheel disc, the outboard face of the overlay is adjacent the lowermost surface of the mold cavity. Although the majority of gas bubbles evolved from the reacting components are trapped within the urethane mixture as the same is curing and gelling toward solidification, such gas bubbles tend to rise and hence some can migrate toward the inboard portion of the overlay closest to the wheel disc 24 while the reaction mixture is still liquid. This migration results in a variation in density axially of the overlay so that a relatively dense but thin skin (usually less than 0.05" in thickness) is produced adjacent the outboard face of the overlay, the urethane becoming less dense and more cellular axially towards the outboard disc surface. Hence, any molding defects, such as large pockets or bubbles, will tend to occur adjacent or at the interface of the overlay and the disc where, generally speaking, such defects are less critical and do not cause as much spoilage in the end product, as compared to casting with the mold inverted so that the mold part is superimposed on the rim and disc subassembly, which tends to locate such casting defects at the outboard face of the overlay.

Although it is generally advantageous to concentrate gas bubble defects at the wheel inboard side of the plastic overlay molded onto the metal wheel backbone, such gas-bubble-induced surface defects still can and do result in appearance defects significant enough to require scrapping and/or rework of such finished wheels after the molding operation. For example, this problem can occur in the formation by molding of the wheel vent windows and associated "scoop" protrusions in the outboard face of urethane body of the "POLYCAST" wheel. These decorative vent scoop communicate with the vent openings or windows in the steel disc of the wheel backbone in order to provide air flow ventilation through the wheel for brake cooling.

The practice typically employed in making such vent windows in the urethane plastic body has been to have the mold vent core fingers or bosses (such as bosses 46 and/or pedestal portions 294 of the aforementioned U.S. Pat. No. 3,762,677, or core bosses 200–212 of the aforementioned U.S. Pat. No. 5,059,106; or the cooperating offset cooperative pedestal cores 330 and clamp cores 332 of the aforementioned U.S. Pat. No. 4,963,083) protrude upwardly from a lower mold part and/or downwardly from the upper clamp part so as to penetrate the "windows" in the steel backbone or disc of the metal portion of the wheel to provide coring for molding of a brake ventilation air passage which extends completely through the wheel. A relatively large clearance is provided between each such mold core and encircling margin of the associated steel disc vent opening so that urethane material flows upwardly therebetween to cover the vent opening edge in the steel disc. This urethane window margin material is prevented from escaping into and onto the inboard face of the steel disc by a suitable imperforate seal construction, typically a silicone seal carried by the upper clamp part of the mold apparatus, such as the seal 236 in the aforementioned 4,963,083 patent or the lid seal 90 of the aforementioned U.S. Pat. No. 5,059,106.

Hitherto it has not been found possible to economically vent the inboard face of the plastic marginal material internally surrounding the metal marginal wall of the disc vent opening at the inboard side of the disc. Hence this as-molded inboard-facing urethane surface is often characterized by pimples, blemishes and irregular open pockets and other such visible surface irregularities resulting from the gas bubble migration upwardly against the inboard window lid seal and the concentration thereof at this window margin surface as the urethane cures and solidifies. Generally, as indicated above, these surface irregularities, although visible when viewing the inboard side of the wheel, have not been considered to be a wheel-scrapping defect inasmuch as the inboard side of the wheel is hidden from view when mounted to a vehicle. Nevertheless such gas bubbles can and do on occasion concentrate close to the inner peripheral edge of the cast urethane window-margin adjacent the lid seal. During the demolding operation, when the seal is raised from the steel disc backbone, some of such gas bubble defects can cause the inner peripheral edge of the cast urethane to break away and thereby create a jagged inner edge in the urethane window scope protrusion. Such a defect indeed is then visible from the exterior side of the wheel when viewing into the urethane air vent scope opening. Such an appearance defect when viewable from the outboard side of the wheel requires rejection of the wheel from a quality control standpoint, thereby requiring either rework of the wheel to repair the defect, if possible, or scrapping of the entire composite wheel.

Other production problems associated with molding of the urethane around the inner margin of the metal disc window include cleaning and maintenance of the window lid seal attached to or carried by the upper mold clamp part, with attendant material and labor cost, as well as the cost of replacement of such seals due to the wear of the seal after repeated cleanings.

OBJECTS OF THE INVENTION

Accordingly, it is an object of the present invention to provide an improved method for making composite metal-elastomer styled wheels in which the problems associated with such gas bubble defects at the inboard face of the urethane body surrounding the inner margin of the steel disc vent opening are substantially reduced or eliminated.

Another object is to provide an improved mold apparatus for practicing the aforementioned method of the invention which is economical in construction and reliable in operation.

A further object is to provide an improved method and apparatus for making the aforementioned wheel construction which achieves the aforementioned objects and yet requires minimum changes in the prior method and apparatus for making prior art wheels of this type.

The present invention, together with additional objects as well as features and advantages thereof, will become apparent from the following detailed description and the appended claims taken in conjunction with the accompanying drawings, which are scaled from engineering drawings unless otherwise indicated, wherein:

BRIEF DESCRIPTION OF THE DRAWINGS

FIG. 3 is a diametrical center cross-sectional view through the complete molding apparatus of the invention illustrating the mold parts in fully closed condition and at the completion of a mold fill cycle with the urethane material cast against the outboard face of the metal disc of the wheel subassembly, and with the vent seal of the invention entrapped in position between the upper clamp annular lid seal and the upper or inboard face of the lower mold part core pedestal and surrounding inboard face of the metal wheel disc.

FIG. 3A is a greatly enlarged view of the portion encircled and labeled at 3A in FIG. 3.

FIG. 8 is a plan view of the outboard side of the annular vent seal of FIG. 1 as it appears after removal from the molding operation.

DETAILED DESCRIPTION OF THE PREFERRED EMBODIMENT

As used herein, the term "outboard" refers to the side of the wheel viewed from the exterior of a vehicle upon which it is mounted, and is also variously referred to in the trade as the "street side", "beauty side" or "curb side" of the wheel. The term "inboard" refers to the opposite side of the wheel facing inward toward the vehicle upon which it is mounted. These terms are also used directionally to indicate corresponding directions parallel to the axis of the rotation of the wheel.

Figure 1:
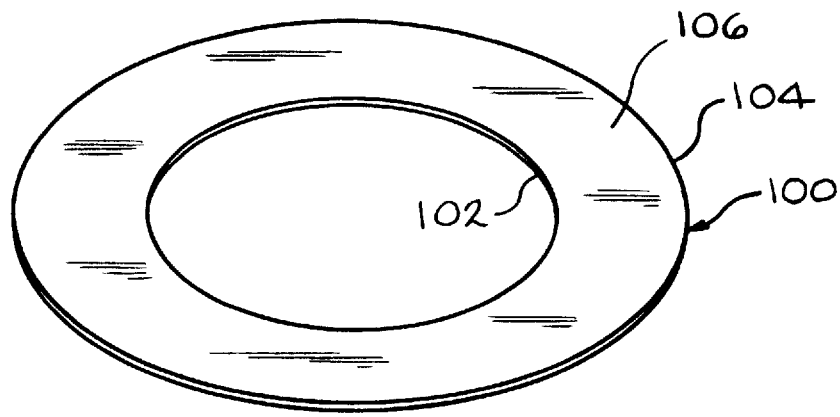
FIG. 1 is a perspective view of one exemplary but preferred embodiment of a venting seal construction provided in accordance with the present invention and shown by itself prior to installation in the mold apparatus of the invention in accordance with the method of the invention.
Figure 2:
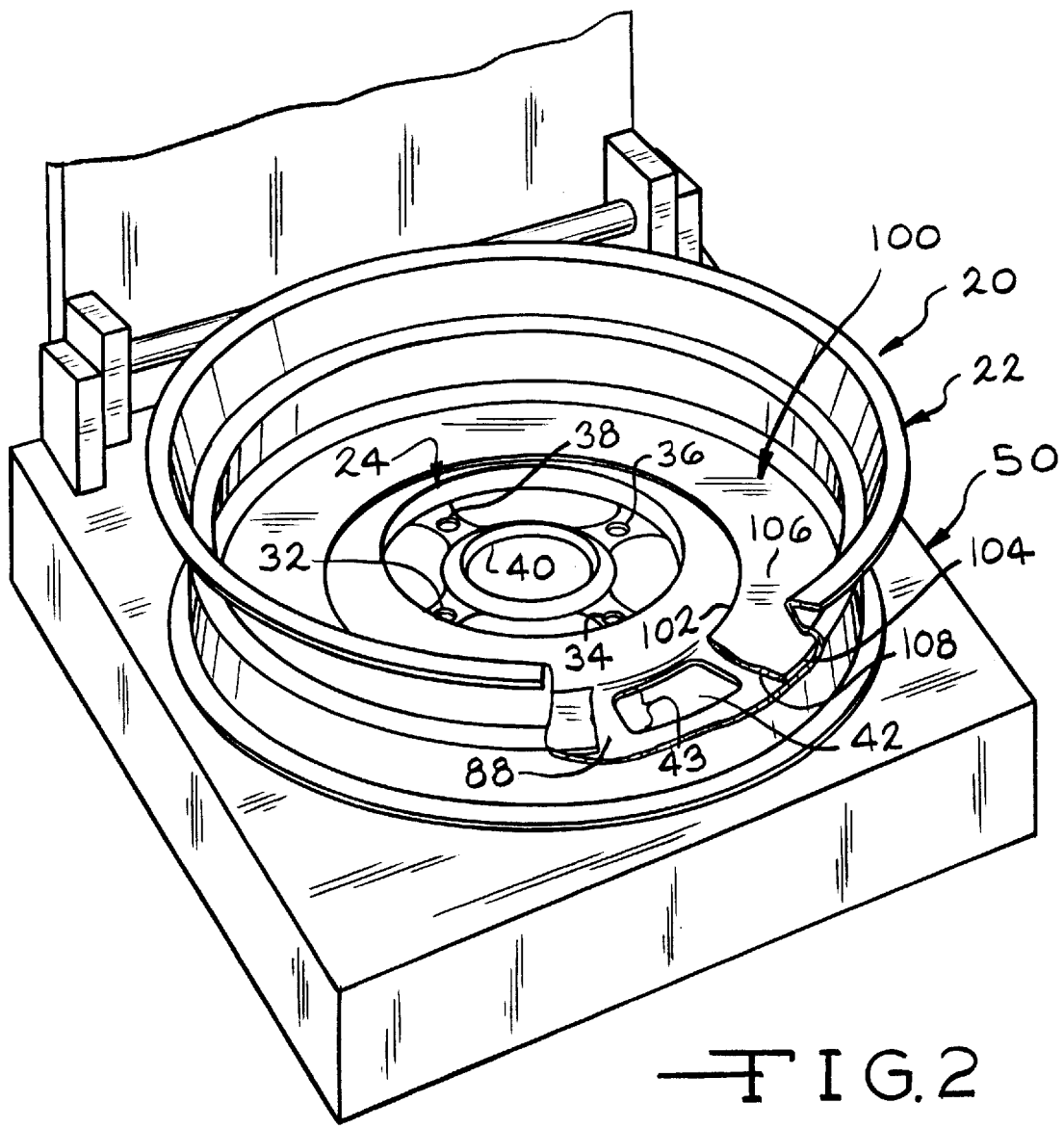
FIG. 2 is a fragmentary perspective view of a metal wheel rim and disc backbone assembly after placement onto the lower mold part of the molding apparatus of the invention, and after placement of the venting seal of FIG. 1 into its molding location against the inboard face of the disc of the wheel subassembly in accordance with the method and apparatus of the present invention.

Referring in more detail to the accompanying drawings, FIGS. 1–3A and FIG. 8 illustrate an exemplary but presently preferred embodiment of an improved vent seal apparatus for practice of the improved method of constructing a composite metal-elastomer styled wheel of the aforementioned "POLYCAST" type in accordance with the present invention. Referring first to FIGS. 2 and 3, the wheel is generally designated at 20 and comprises, by way of a preferred example, a metal "backbone" consisting of a conventional drop center steel rim 22 and a central steel disc 24 (also referred to as a "spider" or "body" in the trade) which is permanently secured, as by welding, to rim 22 prior to the molding operation. Wheel 20 also includes an ornamental three-dimensional contoured plastic overlay, generally designated at 26 (FIG. 3) permanently adhesively secured (in the illustrated exemplary embodiment) to the outboard face 28 of disc 24 and to the outboard, radially inwardly facing surface 30 of rim 22. Disc 24 is provided, prior to the molding operation, with a circular array of wheel mounting bolt holes 32, 34, 36, 38 (FIG. 2) and a central wheel spindle or pilot opening 40 so that wheel 20 can be removably mounted to a wheel hub and/or associated disc brake or drum brake assembly. For decorative purposes and for brake ventilation, a plurality of cutouts or vent holes 42 (also called "disc window openings") are provided in disc 24 (only one of a circular array of five of such holes being shown in FIGS. 2 and 3). The particular configuration of the steel components of wheel 20, including rim 22 and disc 24, may follow solely utilitarian consideration such as strength of the wheel and ease and economy of manufacture, since the outboard aesthetic appearance of the wheel is determined largely by the three-dimensional contour of the ornamental overlay 26. This contour in turn is determined by the particular ornamental or aesthetic appearance created by the designer of wheel 20 and imparted to the lower mold cavity defining surfaces 44.

The molding apparatus of the present invention is generally similar to that employed hitherto commercially in making the aforementioned Motor Wheel POLYCAST wheels, as set forth for example in the aforementioned U.S. Pat. Nos. 3,756,658; 4,963,083 and 5,059,106, depending in part on the type of decorative plastic body 26 to be adhered to the outboard face of the steel disc 24. As in these aforementioned prior art patents, wheel subassembly 20 constitutes the middle mold part of the three part mold components. The other two of these components comprise a lower mold part 50 defining the mold cavity surface 44 for forming the decorative outboard face of the urethane overlay 26, and an upper mold part 52 which serves as a backup support and upper seal carrier for clamping the middle wheel mold part 20 onto lower mold part 50. However, in accordance with the present invention, both the upper mold part 52 and the lower mold part 50 embody improvements in their constructional features over the prior art upper and lower mold parts which cooperate with the middle part 20 as explained in more detail hereinafter, to accomplish the aforestated objects of the invention.

Upper mold part 52 has two pairs of upright posts 54, 56 (only one pair being shown in FIG. 3), which are adapted to be fastened to a suitable molding press ram or fixture for raising and lowering of upper mold part 52, to clear the mold for loading and unloading, and to urge upper mold part 52 downwardly against wheel subassembly 20 to clamp mold apparatus 52-20-50 in its fully closed mold-filling position as shown in FIG. 3.

Upper mold part 52 has a circular lid plate 62 adapted to fit within flange 64 of disc 24 in the closed condition of the mold. Lid plate 62 carries centrally at its underside a circular clamp abutment plate 63 suitably dimensional to engage and push downwardly on the wheel mounting face in the bolt circle area of disc 24 to hold wheel 20 securely seated on lower mold part 50 in the fully closed condition of mold 52-20-50. Posts 54–56 are welded to the upper surface of plate 62, and a steel funnel 68 is secured on the upper surface of plate 62. Funnel 68 has a coaxial neck 72 which extends downwardly through registering openings of lid plate 62 and clamp plate 63 so that the outlet 74 of funnel 68 registers in the closed condition of the mold, with a pour opening 78 provided in the bolt circle area of disc 24. It is to be understood that certain elements have been omitted for clarity, such as the washer shield 78 as disclosed in the aforementioned U.S. Pat. No. 5,059,106.

Lid plate 62 also carries at its underside an annular lid seal assembly 80 consisting of a flat metal ring 82 and a lid seal 84 removably affixed thereto by bolts which extend up through ring 80 into associated threaded openings in clamp plate 62 (not shown). Alternatively, the construction of the two-piece annular seal subassembly may be that disclosed and claimed in U.S. Pat. No. 5,059,106, particularly if the configuration of the disc vent or window openings 42 are of the type described therein. In either event, the prior lid seal is designed for sealing leakage of the liquid urethane reaction mixture from the mold cavity via the disc windows 42. Lid seal 84 comprises a resilient, heat-resistant annular member, preferably molded from silicon rubber. The lower sealing surface 86 of seal 84 is frusto conical and generally complimental to the contour of the inboard surface 88 in the vent window area of disc 24 in the relaxed, free-state condition of lid seal 84. Surface 86 of seal 84 is also dimensioned to overlap each of the disc openings 42, both radially inwardly and outwardly thereof. Seal surface 86 may be specially configured with pads 114 and recess portions 102b alternating circumferentially of the lid seal as in the aforementioned U.S. Pat. No. 5,059,106, or surface 86 may be generally made smooth and flat as illustrated herein. In either case, in the free state condition of lid seal 84, with the mold in fully closed condition as shown in FIG. 3, the seal surface 86 is dimensioned to be spaced slightly below (inboard) of disc surface 88 by distance of 0.040 to 0.060 inches to allow for seal compression and proper sealing. The releasable interengagement of lid seal 84 with the inboard surface 88 of wheel subassembly 20 thus defines a flash forming area along one of the two parting lines of the three part mold (i.e., where upper mold part 52 meets wheel 20 and lower mold part 50 meets wheel 20).

In accordance with another feature of the present invention, lower mold part 50 is provided with the usual circular array of inboard protruding core finger bosses or pedestals 90 (FIGS. 3 and 3A), one for each of the disc vent holes 42 and designed to align therewith in the closed condition of the mold. Each core finger 90 is capped with an extension 92, suitably non-removably affixed to the top surface 94 of finger 90 or made integral with boss 90. Each extension 92 has a circumferentially extending side wall 96 designed to fit with a relatively large radial clearance, on the order of 0.05 to 0.50 inches, within marginal wall 43 of the associated disc opening 42. The upper surface 96 of each extension 92 is made generally complimental in contour to the opposed portion of seal surface 86. In the closed condition of the mold, finger extension surface 96 is designed to be co-planar with the disc surface 88 surrounding the associated vent opening 42. Thus in the fully closed condition of the mold 20-50-52, the juxtaposed seal and finger surfaces 86 and 96 are designed to be in contact at the aforementioned mold parting line (assuming absence of the venting seal membrane insert of the present invention described hereinafter) such that the liquid reaction urethane material poured or injected into the mold cavity via funnel 68 upon filling of the mold cavity inboard of wheel 20 could flow upwardly through the clearance space defined between finger extension peripheral surface 97 and the associated marginal wall 43 of disc window opening 42 but not out onto the inboard surface 88 of disc 24 or onto finger surface 96 since these surfaces would be engaged by lid seal surface 86.

In accordance with one principal feature of the present invention, limited inboard leakage flow of urethane liquid reaction mixture is permitted but controlled in a predetermined manner by the provision of a vent seal membrane insert 100 provided in accordance with the method and apparatus of the present invention as shown in FIGS. 1, 2, 3, 3A and 8. In the exemplary but preferred embodiment of seal membrane 100 illustrated herein, the same is constructed in the form of an annulus configured as a flat thin ring of porous material having circular inner and outer concentric peripheral edges 102 and 104 respectively and parallel and flat inboard and outboard surfaces 106 and 108 respectively. Membrane 100 preferably has a uniform thickness dimension between surfaces 106 and 108 of about 0.01 to 0.10 inches. The diameter of the inner circumferential edge 102 is less than that of the array of the radially innermost marginal edges of the disc window openings 42 by at least about 0.125 inches, and the diameter of the outer peripheral edge 104 of membrane 100 is made greater than that of the array of radially outermost edges of disc window openings 42 by at least about 0.125 inches. Preferably seal 100 is constructed from polyethylene or polypropylene felt fabric having a weight of about 15 ounces per square yard, and is heat seared as by ironing on its outboard surface 108. Optionally, the inboard surface 106 may also be likewise heat seared, thereby creating smooth, flat seared surfaces on both sides preferable from a processing standpoint. The porosity of seal 100 when finished and prior to use in the method of the invention, as measured by gas flow rate therethrough, generally ranges between somewhat less than one to about four cubic feet of air per minute. However, it is also believed that even more porous material could be utilized satisfactorily ranging upwardly in gas flow-through permeability of from 10 to 20 cfm.

In the operation and use of seal 100 in conjunction with the molding apparatus and method of the present invention, wheel backbone assembly 20 is first seated in correct registry on lower mold part 50 in the mold-open condition as shown in FIG. 2. This loading operation brings pedestal fingers 90 with their associated extensions 92 into registry with each associated disc window opening 42 such that the finger surface 96 is generally flush with disc inboard surface 88, and a generally uniform clearance space is defined between the peripheral wall 97 of finger extension 92 and the juxtaposed marginal wall 43 of opening 42.

As a next step, and as shown in FIG. 2, membrane 100 is inserted in the open mold so as to be placed loosely against the inboard surface 88 of disc 24 with its axis generally coincident with that of wheel 20. It is to be understood that, with respect to FIG. 2, finger extension 92 and core finger 90 associated with the illustrated disc vent opening 42 have been omitted from FIG. 2 for clarity. Preferably the membrane inner peripheral edge 102 is dimensioned with a minimum inside diameter so as to be spaced radially of wheel 10 inwardly from the innermost portion of the window edge 43 the proper distance to just clear of the junction of the frusto conical portion 28 of disc 24 with the window area of disc 24, i.e., generally coincident with the inboard face of the crown 29 of disc 24. However, the maximum preferred diameter of inner edge 102 of membrane 100 is that shown in FIG. 3. When inner edge 102 of membrane 100 is made to the minimum diametrical dimension, membrane 100 will tend to be a self-centering insert when dropped onto the wheel 20 with its inboard side facing upwardly as shown in FIG. 2, thereby facilitating installation of membrane 100 into position against the inboard surface 88 of wheel 20. With membrane 100 so inserted and positioned, it will be seen that the same entirely covers each of the window openings 42 in disc 24, and provides an overlap coverage on the surface 88 of disc 24 surrounding the peripheral wall 43 of each window opening 42.

In the next step, the upper mold part or clamp 52 is lowered into mold closed position as shown in FIGS. 3 and 3A. During this closing motion each of the discrete areas of membrane 100 juxtaposed to the opposed lid seal and finger faces 86 and 96 are engaged therebetween and squeezed so as to firmly grip the intervening portion of membrane 100 and to compress the same against finger surface 96 as well as against the disc surface 88 surrounding marginal wall 43. Hence a controlled upper or inboard urethane leakage or overflow outlet clearance space is introduced to communicate with the annular clearance space between finger wall 97 and window wall 43, this communicating leakage space between lid seal and finger faces 86 and 96 now being filled with the compressed material of membrane 100 in this area of the parting line between upper mold part 52 and wheel 20. However, due to the porous nature of the material of membrane 100, gas flow, and to a more limited extent liquid or seepage, can still occur therethrough.

With the mold apparatus 52, 22 and 50 thus closed and so sealed, the next step is to inject the liquid urethane reaction mixture via funnel 68 into the mold cavity defined between the outboard face 28 of disc 24 and the cavity defining surface 44 of lower mold part 50. As this liquid reaction mixture fills the cavity, the same will flow up through the clearance channel between each finger 90–92 and associated window wall 43 until the liquid mixture meets the outboard or under surface of membrane 100. As the liquid is filling the mold cavity, normally under both fill and reaction pressures, the pressurized mold cavity entrapped air as well as the gas fumes evolving from this mixture reaction are forced by the fill and reaction pressure through the porous interstices of membrane 100 and thereby vented to the open space above or inboard of disc 24 (ambient). When the liquid reaction material reaches that area of the outboard (or under surface) of membrane 100 exposed to the finger/window clearance channel, this liquid material also will enter the porous membrane material, and due to the forces of both fill reaction pressures and capillary action, will begin to infiltrate and migrate through the membrane material at a seepage rate of travel. This seepage or liquid infiltration rate is a function of several parameters, including viscosity of the liquid reaction mixture, porosity of seal membrane 100, fill pressure, cure rate, and mold and reaction temperatures. As this liquid migration is occurring in the material of membrane 100, the membrane continues to remain porous to gas flow, and hence gas venting is still occurring as gases are given off by the liquid reaction material, and such gassing creates bubbles which tend to migrate upwardly into and through the finger/window clearance channel. By this time the mold cavity has been completely filled with liquid reaction material and the cure cycle has already commenced. Accordingly, a rapid increase in the viscosity of the liquid mixture, as it is reacting towards gelation and then solid state, is occurring. Due to the curing and solidification of the liquid reaction mixture the seepage or infiltration flow rate of migration of liquid in membrane 100 decreases as it migrates away from its entrance point at the interface between the finger/window clearance channel and the portion of the surface of membrane 100 exposed thereto. This self-blocking action resulting during the migration of the urethane mixture rapidly increases as the membrane in these areas becomes impregnated with the same. Hence it has been found that, at the completion of the molding and mold cure cycles, none of the liquid urethane mixture will have escaped outwardly from the exposed outer or inner circumferential edges 102 and 104 of membrane 100. Instead the residual leakage urethane material will remain entrapped as embedded flash in membrane 100.

The next step is the demolding step in which the mold apparatus is opened by first raising and clearing upper mold part 52 from wheel 20, and then raising and removing wheel 22 clear of lower mold part 50, with the plastic decorative solidified body 26 being permanently adherently affixed to the outboard face of wheel 20. Separation from the lower mold face 44 is facilitated by the mold release applications as set forth in the above listed prior art patents. Once the completed composite metal elastomer wheel 22-24-26 has been separated from the lower mold part 50 membrane 100 is now readily accessible from the inboard side of the wheel and is easily removed therefrom by stripping the same from the inboard face 88 of disc 24. Of course, if desired, membrane 100 can be stripped off of disc 24 as soon as upper mold part 52 is raised and cleared of the wheel, before wheel 20 is raised clear of the lower mold part 50. The completed wheel is then ready for any further finishing operations such as subsequent painting and paint bake cure treatments.

Referring to FIG. 8, upon stripping membrane 100 from wheel 20 at the completion of the demolding operation, the outboard face 108 of membrane 100 will generally have the appearance indicated in FIG. 8. A "flash" band 110 of heavily-urethane-impregnated seal material appears slightly raised from the original membrane surface 108. Band 110 has the contour of the finger/window clearance opening since this is the portion of membrane 100 which was exposed to the mold cavity clearance channel defined between disc window surface 43 and finger peripheral surface 97. The area of seal surface 108 outwardly of band 110 remains in its original condition free of urethane flash. However the surface of area 112 within the confines of band 110 appears partially or completely coated with the solidified urethane material since this portion of membrane 100 is preferably designed as a sacrificial venting area, in addition to that of band 110, to thereby insure continuance of gas venting to the end of the mold fill cycle.

The opposite or inboard surface 106 of seal 100 remains in its original condition as indicated in FIG. 1, but with band 110 visible through membrane 100 due to the loading of the porous material of membrane 100 by the urethane in this area. Typically, membrane 100 is discarded after being flash-impregnated in this one-cycle use and replaced in the next molding cycle with a new seal membrane 100. However in some instances an additional cycle of use may be obtained by inverting membrane 100 so as to place its inboard surface 106 downwardly against the inboard side 88 of the disc in the membrane insertion step of the mold preparation and closing cycle. Even though membrane 100 is intended only for one time use, or preferably two-cycle use by one reuse, and then must be discarded as a "spent" membrane, it has been found that the cost of membrane 100 is, as well as the labor cost involved employing it in the method and apparatus of the invention, is substantially less than that of the total process savings realized from utilizing membranes 100 in accordance with the invention.

Figure 4:
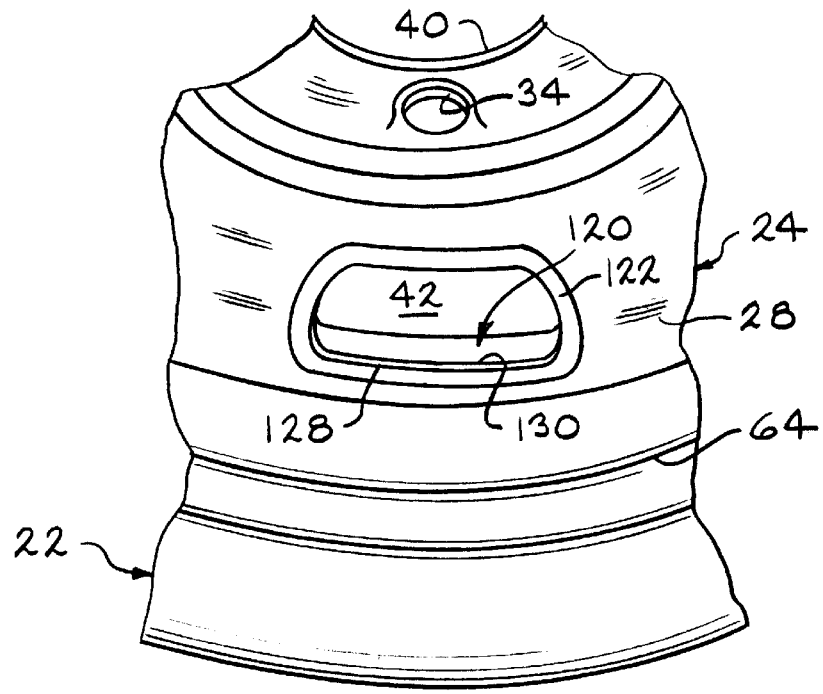
FIG. 4 is a fragmentary perspective view the inboard face of the metal wheel disc and a portion of the associated metal rim illustrating an example of the appearance of the inboard surface of the molded urethane material encircling the inner margin of the metal disc vent opening when constructed in accordance with the present invention.
Figure 5:
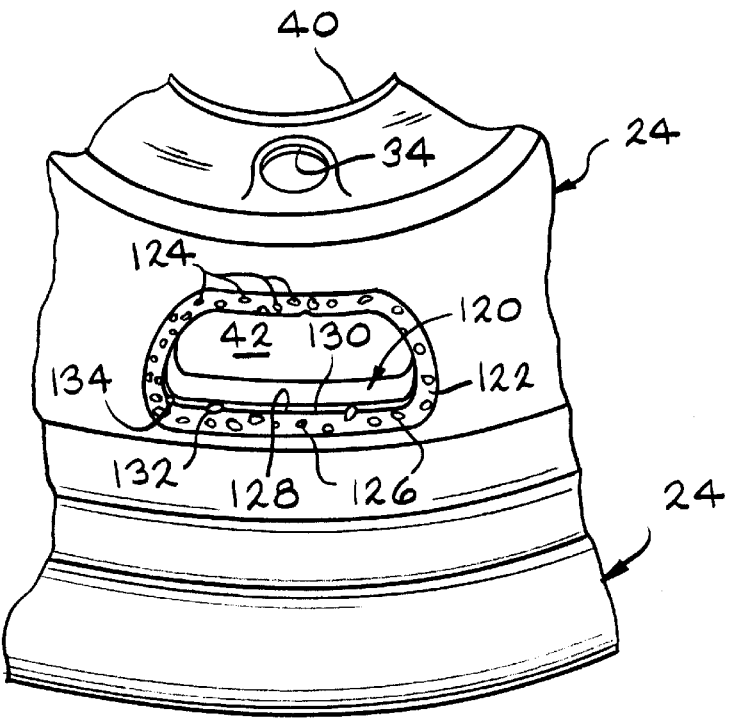
FIG. 5 is a view similar to FIG. 4 illustrating the typical appearance of the inboard surface of the molded urethane window marginal material as molded prior to the utilization of the venting seal construction of the present invention, and illustrating typical gas-surface pimples, blemishes, etc. and associated inner edge tear or void defects therein which occasionally result upon demolding from the gas bubble induced weakness or voids created at this edge.
Figure 6:
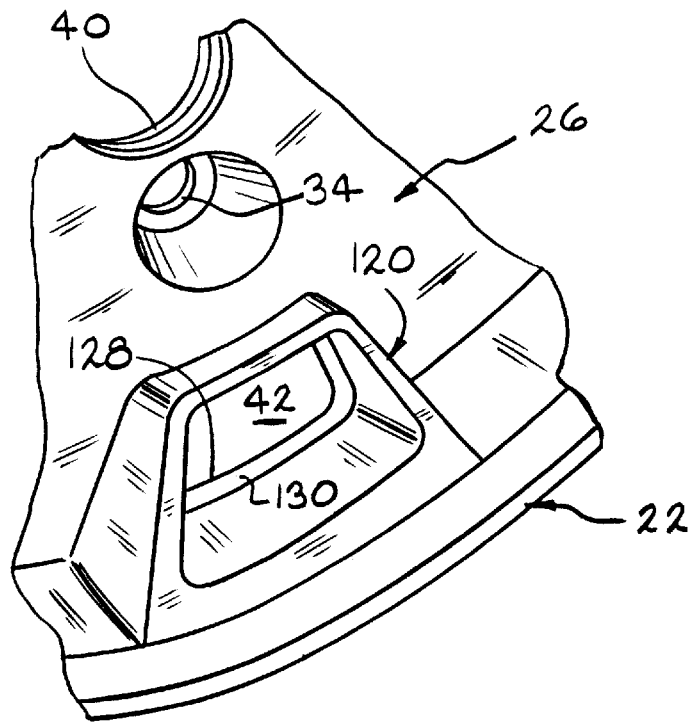
FIG. 6 is a fragmentary perspective view of the outboard side of the portion of the wheel illustrated in FIG. 4 illustrating the urethane molded scoop and inner peripheral surfaces thereof, including the defect-free inboard edge of the molded urethane when molded in accordance with the present invention.

Referring now to FIGS. 4–7, the appearance and condition of the inboard face of the molded urethane window scoop material, after completion of the molding cycle and removal of membrane 100, is shown in FIGS. 4 and 6 as viewed respectively from the inboard and outboard sides of the wheel. For comparison purposes, these corresponding areas of the wheel after completion of the molding cycle when made in accordance with prior practice without the use of membrane 100 are illustrated respectively in FIGS. 5 and 7.

Figure 7:
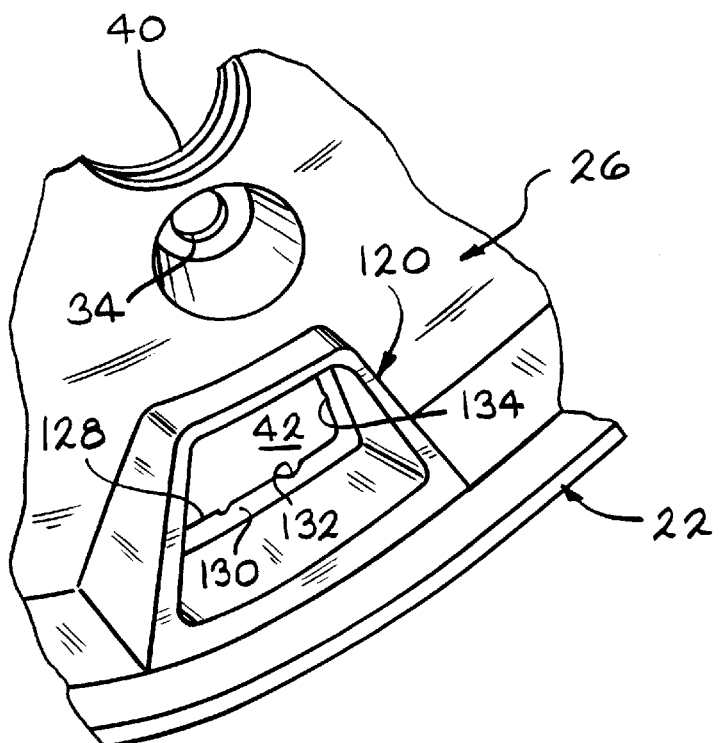
FIG. 7 is a fragmentary perspective view of the outboard portion of the wheel illustrated in FIG. 5 and illustrating the appearance of the defects shown in FIG. 5 as they appear when viewed from the outboard side of the wheel looking through the urethane scoop window.

Referring first to FIGS. 5 and 7, the decorative window scoop 120 molded from the urethane material as an outboard protrusion of a decorative body 26 is shown in FIG. 7 as it appears when viewed from the outboard side of the wheel. FIG. 5 illustrates the appearance of the urethane scoop structure 120 as viewed from the inboard side of the wheel. In this exemplary illustration of the results of usage of the prior molding apparatus and method, membrane 100 was absent from the mold apparatus and hence the lid seal 80 directly engaged the inboard surface 88 of disc 24 and the juxtaposed surface 96 of finger extension 92. This prior art set-up thus creates essentially a completely sealed, non-vented condition at the inboard end of the clearance channel formed between disc window marginal surface 43 and finger peripheral surface 97. Upon demolding it will be seen that the inboard face 122 of the inboard edge of scoop 120, which was juxtaposed to seal surface 86 during the molding operation, is characterized by a multiplicity of bubbles 124 interspersed with pockets or voids 126. In many instances, these blemishes are not necessarily considered to be quality defects of a character requiring rework or scrappage of the finished composite metal-elastomer wheel inasmuch as they are hidden from view when the wheel is mounted to a vehicle. Hence their unsightly appearance would go unnoticed in the actual usage intended for the wheel.

However, in a significant number of instances in wheels made by utilizing the aforementioned prior art set-up, upon completion of the molding and demolding operation, outboard-visible defects will appear. Typically such defects will occur at the inboard edge 128 of the molded urethane scoop 120, i.e., that edge defined by the junction of the inboard face 122 of scoop 120 and the interior scoop surface 130, which in turn are respectively formed in molding by lid seal 80 and the periphery 97 of core finger 90. These visible defects are illustrated at 132 and 134 in FIGS. 5 and 7 and thus can be seen from both the outboard as well as the inboard side of the wheel. Defects 132 and 134 represent large jagged edge installations caused by a large pocket of gas collecting in the urethane as the urethane cured and solidified, thereby producing either a complete void or a very weak zone which tears away upon demolding.

Such defects 132 and 134, being visible from the outboard side of the wheel, are difficult, if not impossible, to repair in an acceptable fashion by such post-molding operations as flash trimming. Hence the entire finished composite metal-elastomer wheel must be scrapped when such defects are present, thereby significantly adding to the cost of manufacture of such wheels.

By contrast, as seen by comparing FIGS. 4 and 6 to FIGS. 5 and 7, the same wheel when molded with the use of vent seal 100 as described previously is free of any such defects 132 and 134, thereby eliminating wheel scrappage. In addition, as shown in FIG. 4 scoop inboard surface 122 is characterized by an absence of any of the bubbles, blemishes and/or pimples 124 and 126 shown in FIG. 5. As shown in both FIGS. 4 and 6, the inboard edge 120 at the junction of surfaces 122 and 130 presents a clean sharp line as contrasted to the unsightly jagged edge of FIGS. 5 and 7. Moreover, despite the controlled flash leakage permitted by membrane 100, the metal surface of the inboard side 28 of disc 24 in the area immediately surrounding window margin 122 is completely free of any urethane flash material. Accordingly it has been found that use of the above described venting seal membrane 100 in accordance with the method and molding apparatus of the invention results in substantial savings in terms of wheel scrappage costs, as well as several other advantages.

In addition to eliminating the aforementioned causes of wheel scrappage, use of the membrane 100 of the invention results in significant labor savings. For example, the labor involved in cleaning the surface 86 of lid seal 84 is eliminated, as is the labor involved in flash trimming of the edge 128 of the window scoop 120. Elimination of, or the substantially reduced need for, cleaning of lid seal 84, as well as the surface 96 of core finger 90, when using membrane 100 also substantially reduces the cost of lid seal usage due to the reduction or elimination of the cost of seal replacements and their removal and installation. It has also been found that the cycle pour time for injection of the urethane liquid reaction mixture can be reduced when using membrane 100, and that the pour volume can also be reduced. This results in savings in both material costs and production cycle times. Further savings result from eliminating the need to buff window edges and the concommittent reduction in possible carpal tunnel syndrome caused by the repetative manual labor involved in such operations. The equipment utilized in buffing and brushing flash in the window area, referred to as an "IMC brush", is no longer needed, thereby providing savings in repair and replacement of such equipment as well as the labor cost involved in these operations for reclaim handling and off-line window repairs. Energy savings also result due to reduced demand for factory compressed air. A reduction in the quality control personnel needed on the production line is also realized. All of these factors add up to a significant reduction in the end cost of the composite metal elastomer wheel when produced in accordance with the method and apparatus of the present invention.

Additional potential advantages obtained from utilizing the venting seal membrane 100 of the invention include:

use as soap mask rings noiseless soap mask rings elimination of the need to wash mask rings longer lid seal life reduced lid seal cost less lid seal soap usage less soap scrap (burns, foreign material)

In successful working examples of a venting seal membrane 100 constructed and used in accordance with the present invention, the following parameters and specifications were observed:

Wheel 20 Example 1.

Wheel Specification: General Motors Part No. 42113

Number of Vent Window openings - - - 5

Membrane 100 O.D. (Diameter of outer edge 104) - - - 11⅞ inches

Membrane 100 I.D. (Diameter of inner edge 102) - - - 7¼ inches

Thickness of seal 100 - - - 0.040 inches

Membrane 100 Material - - - 15 oz./sq. yd.

Membrane 100 Porosity - - - 5 to 10 cfm

Membrane 100 Heat Searing Details - - - seared on both sides flat surface

Wheel 20 Example 2.

Wheel Specification: Diamond Star Part No. 41974

Number of Vent Window openings - - - 6

Membrane 100 O.D. (Diameter of outer edge 104) - - - 14⅛ inches

Membrane 100 I.D. (Diameter of inner edge 102) - - - 7½ inches

Thickness of seal 100 - - - 0.040 inches

Membrane 100 Material - - - 5 oz./sq. yd.

Membrane 100 Porosity - - - 5 to 10 cfm

Membrane 100 Heat Searing Details - - - seared on both sides flat surface

Estimated Range of Clamping Pressure Exerted by lid seal 80 and core finger 90 on membrane 100 (Examples 1. and 2.): 600–800 psi Pour time for Example 1.: 13.75 seconds Pour time for Example 2.: 4.15 seconds Urethane molding Materials: see U.S. Pat. No. 3,756,658, col. 4, lines 61–68; col. 5, lines 1–68; col. 6, lines 1–68; col. 7, lines 1–68.

It will also be understood that venting seal membrane 100 may be constructed from other materials and to other specifications consistent with the usage of the same envisioned in accordance with the method and apparatus of the present invention. However, experiments with siliconized cotton material and Teflon material indicate that such materials are less desirable than the preferred embodiment disclosed hereinabove, i.e., polypropylene felt fabric heat seared on one or both sides. The preferred starting blank material utilized in construction of the custom die-cut membrane 100 is preferably obtained by utilizing the following process parameters:

Chopped polypropylene fibers are randomly deposited in mat fashion on a moving conveyor and fed therefrom through and pressed between rollers of a calendaring machine in order to smooth the same into a coherent felt-like fabric web of sheet material having a weight of about 15 ounces per square yard. This fabric web is then fed through heated ironing rolls to heat sear at least one side, and preferably both sides of the sheet material, taking care not to reduce the material porosity below the aforementioned lower permeability limit of about one cfm. The heat searing step may be performed by heated roller or flame, and is effective to heat fuse the fabric fibers at the fabric surface to thereby reduce the fiber strand surface area and provide a smooth sealing surface. The fusing seals a portion of the outer surface of the fabric, thereby creating a porous surface film which enhances releasability between the fabric and polyurethane cured foam. The higher the percentage of film formation, the better the release prospectives of the film from the cured polyurethane material, but the poorer the permeability to air and liquid urethane reaction mixture. On the other hand increasing the fabric porosity will increase permeability to air and liquid urethane reaction mixture, but foam releasability will be poorer due to greater saturation and consequent adhesion to the fabric matrix and a less desirable window edge finish.

The finished material may be stored in roll form and subsequently unrolled to be suitably die cut to appropriate specified dimensions for utilization as the foregoing mold seal. As alternatives to the preferred polypropylene material for membrane 100, a thin, non-woven fiber laminate or a thin, woven perforate fabric made of polyethylene may be utilized. However, any material chosen must be able to withstand the effects of wheel pre-heat temperatures, and post-molding cure bake cycle, usually in the order of 150°–200° F. maximum and release from polyurethane foam.

It is also to be understood that, although the foregoing description and drawings describe and illustrate in detail various preferred embodiments of the present invention, to those skilled in the art to which the present invention relates, the present disclosure will suggest many modifications and constructions as well as widely differing embodiments and applications without thereby departing from the spirit and scope of the invention.

For example, it is also to be understood that the clamping surface 86 of lid seal 84, as well as the clamping surface 96 of core finger 90, may be especially adapted for use with membrane 100. Preferably these surfaces are contoured, somewhat similar to the contouring of the lid seal bottom wall 102 of seal 90 in the aforementioned U.S. Pat. No. 5,059,106 so as to define higher squeeze pressure or compression portions on membrane 100 between the disc surface 88 and lid seal surface 86 (FIG. 3A) than between core finger surface 96 and the juxtaposed area of lid seal surface 86. This differentiation in clamping pressure exerted on membrane 100 will tend to reduce migration of urethane into the material of membrane 100 outwardly of the flash band area 110 (FIG. 8), while at the same time allowing urethane flow inwardly thereof into the contained sacrificial area 112 and even further into the seal material toward the inboard surface 108 of membrane 100. Hence the portion of membrane 100 within the band 110 can be utilized as a "flash sink" to prolong the ability of seal 100 to vent gas from the urethane material in the window clearance channel so that gas bubble accumulation at the urethane-seal interface is eliminated or minimized, and good fill conditions are prolonged in this venting channel. In addition, the enhanced ability to vent the mold cavity at each of the disc window openings reduces both cycle pour time and the volume of gas venting needed or occurring at the outer periphery of body 26 when utilizing, for example, the vent seal construction of U.S. Pat. No. 5,059,106.

Another embodiment variation contemplates die-cutting of heat seared porous felt fabric sheet material of the type prepared for membrane 100, into a plurality of annular segments instead of complete annulus. Each such segment is sized to overlay and overlap only one associated disc window 42. The appropriate number of such segments are suitably temporarily or permanently affixed to a suitable non-reusable temporary or reusable permanent carrier. The carrier may be made up of inner and outer concentric wires (metal or plastic) interconnected by cross-stringers located so as to position the same in use between disc windows. The segments are arranged in an annular row on the carrier at the correct spacing to individually cover the row of windows 42 in the associated disc 24, with the carrier perimeter wires disposed in bounding spaced relation to lid seals 84. Such a carrier-supported, discontinuous membrane annulus offers material savings by reducing scrap waste in the die cutting pattern layout.

It is also contemplated that a venting seal annular membrane may be constructed for disposition in another flash forming area along the other of the two parting lines of the three part mold 50-20-52, i.e., between the outboard flange of rim 22 and an outboard rim flange seating surface provided on lower mold part 50 to thereby vent the outer perimeter of the mold cavity via such an O.D. venting seal membrane. In such applications, the membrane fabric is heat seared to form a relatively smooth surface facing the mold cavity and having a minimum workable porosity value. This seared surface may then be finish spray coated with a suitable mold release material to improve surface appearance of the molded urethane after separation of the membrane from the area of the cured urethane juxtaposed to the venting membrane during the molding cycle.

The O.D. membrane seal may be suitably configured and positioned for insertion into the space provided by removal of the vent grooves 456 and intervening lands 452 in the O.D. vent seal construction shown and described in conjunction with FIGS. 12 and 13 of U.S. Pat. No. 4,963,083.

Alternatively, the O.D. membrane seal may be configured for insertion in the trench formed by removing the lands between grooves 522 in the FIG. 14 embodiment of the '083 patent. The area of grooves 648 of the FIG. 15 embodiment of the '083 may be likewise modified to accept an O.D. membrane seal of the invention.

The present invention, therefore, is intended to be limited only by the scope of the appended claims and the applicable prior art.

We claim:

1. A method of molding a composite styled metal and plastic vehicle wheel of the type having a metal disc and rim subassembly operable as a metal street wheel when a pneumatic tire is mounted on said rim and a decorative plastic body affixed and molded to an outboard surface of the wheel to form such composite styled wheel, the disc having a circular row of air venting window openings therethrough, said method utilizing molding apparatus including a lower mold part adapted to disposed to be in sealing engagement against an annular outboard surface of the wheel in the closed condition of the mold apparatus and having a mold cavity surface operable in the mold closed condition to define with such wheel outboard surface, a mold cavity adapted to provide an ornamental wheel mold for forming the decorative plastic body with window openings formed in the plastic body individually registering with the disc window openings, and an upper mold part comprising a clamp operable for seating in the mold closed condition against an inboard face of the wheel for urging the same into sealing engagement with the lower mold part, the clamp carrying a flexible annular seal shaped for engagement with the inboard face of the disc in overlying relation with the disc windows to thereby define a flash forming area along a mold parting line where the annular seal and disc inboard face window openings meet, the mold parts being axially separable from one another to open the mold apparatus and clear the clamp along the parting line from the wheel and the wheel from the lower mold part, said method comprising the steps of:

(1) providing a gas permeable and liquid infiltratable flexible and compressible membrane means made of thin generally flat flexible and compressible porous material having opposed major surfaces defining the thickness dimension of the material, (2) when the wheel and the upper mold part clamp seal are separated from one another, placing said membrane means with one of its major surfaces loosely against the disc inboard surface such that at least a first portion of the membrane means will remain directly exposed to ambient atmosphere exteriorly of the disc inboard surface when the clamp seal and wheel are closed together to define the parting line so that after such closure the membrane means remains in gas venting communication with ambient atmosphere externally of the mold cavity via the first portion of the membrane means, and such that a second portion of the membrane means remains directly exposed to and forms a mold cavity surface within the marginal edge of each associated one of the disc window openings when the clamp seal and wheel are closed together and thus remains interiorly exposed in gas venting communication with the mold cavity through such disc window openings, (3) closing said lower and upper mold parts against the metal wheel to thereby cause the flexible clamp seal to yieldably squeeze the membrane means by direct engagement of its major surfaces with and between the respectively adjacent clamp seal and wheel to thereby conform, in response to such closure, the membrane means with the disc inboard surface to thereby define a parting line interface between the membrane means one major surface and the disc inboard surface at and within the edge of each disc window opening, (4) filling the mold cavity with liquid urethane reaction mixture and allowing the same to infiltrate the membrane means via the second portion interiorly exposed surface in the associated disc window opening as gas is being vented from the mold cavity to ambient along the parting line via flow in the membrane means first portion between its major surfaces thence out to ambient via the exteriorly exposed surface of the membrane means first portion, (5) causing the urethane reaction to solidify by curing in the mold cavity while simultaneously removably attaching the membrane means to the disc by adhesion between the cured urethane reaction mixture and the membrane means second portion, (6) opening the mold apparatus after solidification of the reaction mixture to expose the inboard surface of the wheel with the membrane means so adhesively attached thereto, and (7) removing said membrane means from the wheel by peeling the adhered one major surface of the membrane means surface off of the disc inboard surface and off of the cured urethane mixture along their parting line interface with the membrane means one major surface.

2. The method set forth in claim 1 wherein said membrane means comprises porous fabric material.

3. The method set forth in claim 2 wherein said membrane means fabric material comprises random fibers arranged into sheet form and selected from the group consisting of:
   (a) polyethylene,
   (b) polypropylene,
   (c) Teflon coated polyethylene,
   (d) Teflon coated polypropylene,
   (e) Silicone coated polypropylene, and
   (f) Silicone coated polyethylene.

4. The method set forth in claim 1 wherein the lower mold part includes a plurality of vent-pocket-forming cores disposed in the mold cavity and having free ends adapted for individual registry with the disc vent window openings so as to protrude thereinto from the mold cavity in the mold closed condition with a clearance space remaining between each of the free ends of the cores and the associated edge of the disc vent window opening and to thereby form the plastic body window opening and to define in part the parting line, and said method further comprises:

constructing and arranging the membrane means in steps (1) and (2) in radially and axially overlapping relation to the disc inboard face and the free ends of the cores in the mold closed condition for ventably sealing such core-disc window opening clearance spaces along the parting line via the interiorly exposed surface of the membrane means second portion.

5. The method set forth in claim 4 wherein the membrane means is constructed and arranged in an annular planar array in step (1) and inserted in step (2) in the mold apparatus, prior to closure of the upper mold part onto the wheel, as an overlay disposed against the inboard side of the disc so as to simultaneously cover the inboard side of all of the disc openings.

6. The method set forth in claim 5 wherein the annular membrane means overlay comprises a circumferentially continuous planar annulus of coherent material as provided in step (1).

7. The method set forth in claim 5 wherein the annular membrane means overlay as described in step (1) comprises a discontinuous annulus made up of an annular row of circumferentially spaced segments of the membrane means and in step (2) are inserted in the mold apparatus with such segments arranged in individual overlying relation with associated ones of the disc window openings.

8. The method set forth in claim 1 wherein the membrane means material comprises a porous material having a gas permeability ranging between about one to twenty cubic feet of air per minute.

9. The method set forth in claim 8 wherein the gas permeability ranges between about one to four cubic feet of air per minute.

10. The method set forth in claim 8 wherein the membrane means porous material comprises a fabric material consisting of fibers processed into coherent sheet form having a thickness ranging between about 0.01 inches to about 0.10 inches between said opposed major surfaces and having a weight in the order of about 15 ounces per square yard.

11. The method set forth in claim 10 wherein the membrane fabric material is heat seared on at least the one of the opposed major surfaces thereof.

12. The method set forth in claim 10 wherein the membrane fabric material is coated with a silicone mold release material on at least the one of said major surfaces.

\* \* \* \* \*